(No Model.)
J. HORN.
HAY FORK.
No. 416,917.   Patented Dec. 10, 1889.
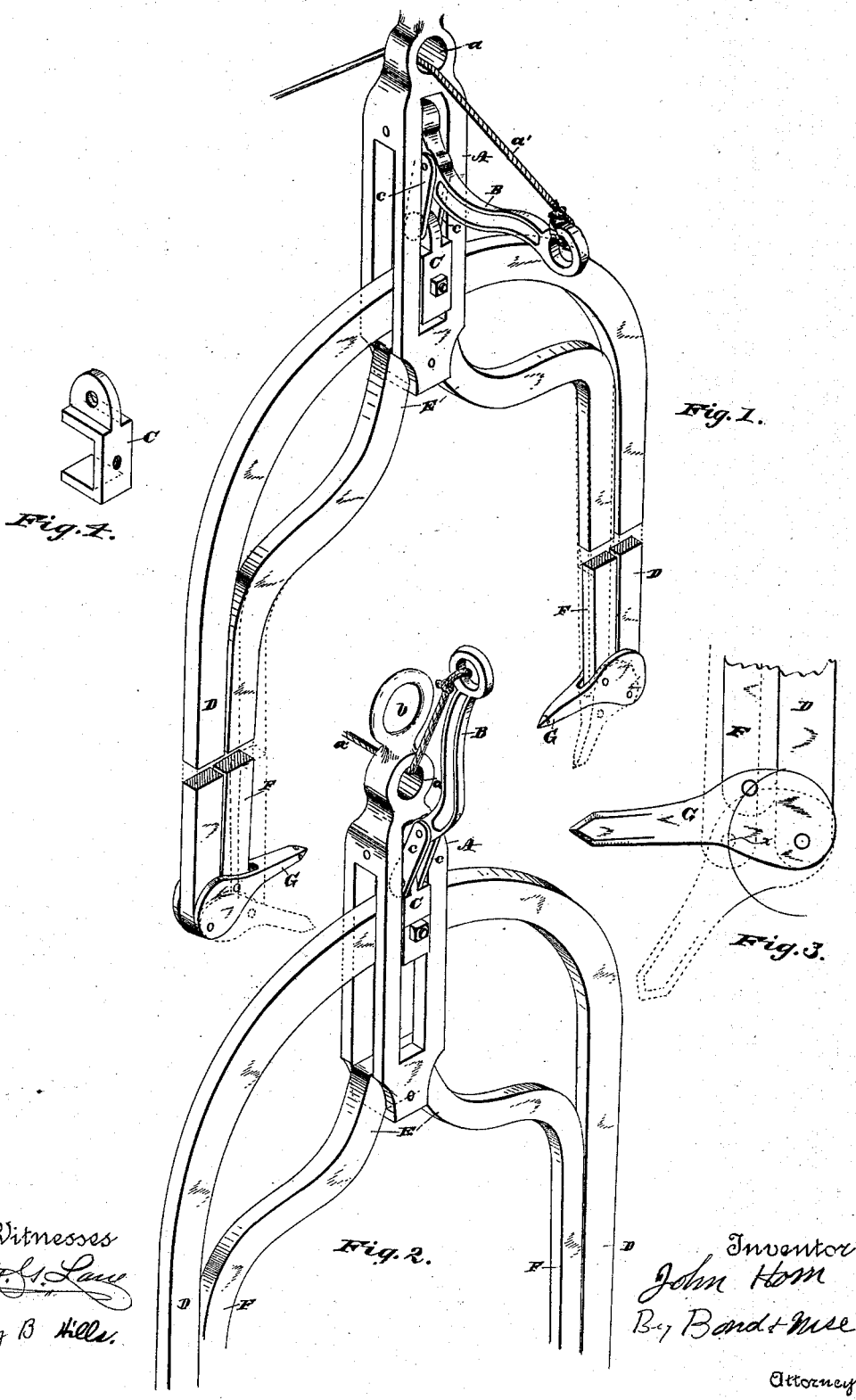

UNITED STATES PATENT OFFICE.

JOHN HORN, OF CANAL DOVER, OHIO.

HAY-FORK.

SPECIFICATION forming part of Letters Patent No. 416,917, dated December 10, 1889.

Application filed April 24, 1889. Serial No. 308,359. (No model.)

*To all whom it may concern:*

Be it known that I, JOHN HORN, a citizen of the United States, residing at Canal Dover, in the county of Tuscarawas and State of Ohio, have invented certain new and useful Improvements in Hay-Forks; and I do hereby declare that the following is a full, clear, and exact description of the same, reference being had to the annexed drawings, making a part of this specification, and to the letters of reference marked thereon, in which—

Figure 1 is an isometrical view showing the fork proper in position for holding a load of hay. Fig. 2 is a view of the top portion of the fork, showing the lever in the position assumed when the lifting-fingers are turned to release the load. Fig. 3 is a view showing the manner of attaching the lifting-fingers to the tines and bars. Fig. 4 is a detached view of the sliding head or block.

The present invention has relation to hay-forks; and it consists in the different parts and combination of parts hereinafter described, and particularly pointed out in the claim.

Similar letters of reference indicate corresponding parts in all the figures of the drawings.

In the accompanying drawings, A represents the head, which is substantially of the form shown in the drawings, and as shown is provided with the eyes $a$ and $b$, the eye $a$ being for the purpose of receiving the trip-rope $a'$ and the eye $b$ being for the purpose of attaching the elevating-rope. To the top or upper portion of the head A is pivotally attached the lever B. To this lever B is pivotally attached the links $c$, which links are pivotally attached to the sliding-head C. To the sliding head C is securely attached the top or upper portion of the tines D.

To the bottom or lower end of the head A is securely attached the yoke E, which yoke is formed integral with the bars F, said bars being so formed and adjusted that they will fit the inner sides of the tines D when in their normal position. The bars F are formed of spring material, for the purpose hereinafter described. To the bottom or lower ends of the tines D are pivotally attached the lifting-fingers G, and said lifting-fingers are also pivotally attached to the bottom or lower ends of the bars F. The point of pivoting the lifting-fingers G to the tines D is a short distance below the pivotal point to the bars F, when said lifting-fingers are placed in the position shown in Fig. 1. The object and purpose of so pivoting the lifting-fingers is to cause the bottom or lower end of the bars F to describe an arc as the lifting-fingers G are turned from a position at right angles to the bars and tines to a position in line with said bars and tines.

It will be seen that, by forming the bars F of spring material and so adjusting them that their normal position will come in close contact with the tines D, as said fingers are moved the bottom or lower ends of the bars F will be drawn inward or away from the tines D until they reach a point, as at $x$, Fig. 3, at which time the bars F will automatically assume their normal position, thereby forcing or throwing the lifting-fingers G in line with the tines D and bars F. It will also be seen that as the lifting-fingers are being brought to a position at right angles to the bars F and tines D, the bars F will be forced away from the tines D until they reach a point, as $x$, Fig. 3, when the lifting-fingers will automatically assume a position at right angles to the tines and bars, thereby assisting in elevating the tines D and causing the lever B to be automatically elevated after the connecting-links $c$ have passed beyond the dead-center. The trip-rope $a'$ is used to lift the lever over the dead-center. It will be understood that the same object can be accomplished by forming the tines D of spring material or by dividing the spring between the bars F and tines D; but I prefer to form the bars F of spring material and leaving the tines D rigid.

Having fully described my invention, what I claim as new, and desire to secure by Letters Patent, is—

In a hay-fork, the combination, with the head A, the lever B, pivoted thereto, the sliding head C, pivotally connected with the lever B, the links $c$, and the tines F and D, connected, respectively, with the heads A and C, said tines F formed of spring metal, of the lifting-fingers G, pivoted to the tines D and F in such manner that the spring-tines F will retain them in either their horizontal or vertical positions, substantially as described.

In testimony that I claim the above I have hereunto subscribed my name in the presence of two witnesses.

JOHN HORN.

Witnesses:
J. L. CARABIN,
G. F. SCOTT.